(12) United States Patent
Johnson

(10) Patent No.: US 8,116,451 B2
(45) Date of Patent: *Feb. 14, 2012

(54) KEY VALIDATION SCHEME

(75) Inventor: Donald B. Johnson, Manassas, VA (US)

(73) Assignee: Certicom Corporation, Mississauga (CA)

( * ) Notice: Subject to any disclaimer, the term of this patent is extended or adjusted under 35 U.S.C. 154(b) by 285 days.

This patent is subject to a terminal disclaimer.

(21) Appl. No.: 11/705,020

(22) Filed: Feb. 12, 2007

(65) Prior Publication Data

US 2007/0147607 A1   Jun. 28, 2007

Related U.S. Application Data

(63) Continuation of application No. 10/181,356, filed as application No. PCT/CA98/00959 on Oct. 14, 1998, now Pat. No. 7,215,773.

(51) Int. Cl.
*H04L 9/30* (2006.01)

(52) U.S. Cl. ............ 380/44; 380/282; 380/30; 713/156; 713/171

(58) Field of Classification Search ............... 380/259, 380/277, 282, 44, 30; 713/156, 171
See application file for complete search history.

(56) References Cited

U.S. PATENT DOCUMENTS

| | | | |
|---|---|---|---|
| 4,351,982 A | 9/1982 | Miller et al. | |
| 4,405,829 A | 9/1983 | Rivest et al. | |
| 4,633,036 A | 12/1986 | Hellman et al. | |
| 4,868,877 A | 9/1989 | Fischer | |
| 4,956,863 A | 9/1990 | Goss | |
| 4,995,082 A | 2/1991 | Schnorr | |
| 5,146,500 A | 9/1992 | Maurer | |
| 5,150,411 A | 9/1992 | Maurer | |
| 5,159,632 A | 10/1992 | Crandall | |
| 5,241,599 A | 8/1993 | Bellovin et al. | |
| 5,271,061 A | 12/1993 | Crandall | |
| 5,272,755 A | 12/1993 | Miyaji et al. | |
| 5,299,263 A | 3/1994 | Beller et al. | |
| 5,351,297 A | 9/1994 | Miyaji et al. | |
| 5,442,707 A | 8/1995 | Miyaji et al. | |
| 5,463,690 A | 10/1995 | Crandall | |
| 5,497,423 A | 3/1996 | Miyaji | |

(Continued)

FOREIGN PATENT DOCUMENTS

EP    0383985    8/1990

(Continued)

OTHER PUBLICATIONS

Balenson, D. et al.; "Privacy Enhancement for Internet Electronic Mail: Part III: Algorithms, Modes and Identifiers"; RFC 1423; Sec. 4.1.1: RSA Keys; Feb. 1993.

(Continued)

*Primary Examiner* — Eleni Shiferaw
*Assistant Examiner* — Paul Callahan
(74) *Attorney, Agent, or Firm* — Novak Druce + Quigg LLP

(57) ABSTRACT

A system and method for validating digital information transmitted by one correspondent to another in a data communication system. The method comprising the steps of generating a public key in accordance with a predetermined, generating a public key in accordance with a predetermined cryptographic scheme having predetermined arithmetic properties and system parameters. The verifying said public key conforms to said arithmetic properties of said scheme, transmitting said verified public key to a recipient.

31 Claims, 1 Drawing Sheet

U.S. PATENT DOCUMENTS

| | | | |
|---|---|---|---|
| 5,581,616 | A | 12/1996 | Crandall |
| 5,600,725 | A | 2/1997 | Rueppel et al. |
| 5,625,692 | A | 4/1997 | Herzberg et al. |
| 5,627,893 | A | 5/1997 | Demytko |
| 5,661,803 | A | 8/1997 | Cordery et al. |
| 5,666,416 | A | 9/1997 | Micali |
| 5,724,425 | A | 3/1998 | Chang et al. |
| 5,761,305 | A | 6/1998 | Vanstone et al. |
| 5,768,388 | A | 6/1998 | Goldwasser et al. |
| 5,987,131 | A | 11/1999 | Clapp |
| 6,141,420 | A | 10/2000 | Vanstone et al. |
| 6,192,130 | B1 | 2/2001 | Otway |
| 6,209,091 | B1 | 3/2001 | Sudia et al. |
| 7,215,773 | B1 | 5/2007 | Johnson |
| 7,567,669 | B2 * | 7/2009 | Vanstone et al. ............... 380/30 |
| 2007/0147607 | A1 | 6/2007 | Johnson |

FOREIGN PATENT DOCUMENTS

| | | | |
|---|---|---|---|
| EP | 0384475 | A1 | 8/1990 |
| EP | 0503119 | A | 9/1992 |
| EP | 0535853 | A2 | 4/1993 |
| EP | 0535863 | | 4/1993 |
| EP | 0735720 | A2 | 10/1996 |
| EP | 0535863 | B1 | 1/2002 |
| JP | 04-191787 | A2 | 7/1992 |
| JP | 06-043808 | A2 | 2/1994 |
| JP | 07-326225 | A2 | 12/1995 |

OTHER PUBLICATIONS

Koblitz, N.; A Course in Number Theory and Cryptography; Ch. VI. Elliptic Curves; 1994; Springer-Verlag, New York.

Schroeppel, R. et al.; "Fast Key Exchange with Elliptic Curve Systems"; Mar. 31, 1995, pp. 1-9.

Schneier, B.; Applied Cryptography Protocols, Algorithms, and Source Code in C; $2^{nd}$ ed.; Oct. 1995; pp. 513-525, 480-481; Wiley.

Coffey, T. et al.; "Logic for verifying public-key cryptographic protocols"; IEEE Proceedings: Computers and Digital Techniques; Jan. 1997; pp. 28-32; vol. 144, No. 1.

Lim, C. H. and Lee, P.J.; "A Key Recovery Attack on Discrete Log-based Schemes Using a Prime Order Subgroup"; Advances in Cryptology-Crypto '97, Aug. 17-21; pp. 249-263; Springer-Verlag.

Abdalla, M. et al.; "DHIES: An Encryption System Based on the Diffie-Hellman Problem"; Sep. 18, 2001; pp. 1-25.

Van Tilborg, H.; "Elliptic Curve Cryptosystems; Too Good to be True?"; Nieuw Archief Voor Wiskunde; Sep. 2001; pp. 220-225; vol. 2, No. 3; Stichting Mathematisch Centrum.

Schneier, Applied Cryptography, 1st Ed; pp. 144 to 145; 1994; John Wiley & Sons.

Schneier, Applied Cryptography, 2nd Ed; pp. 476 to 479, 480, 481, 513 to 525; Oct. 1985; John Wiley & Son.

Arazi, B; Integrating a Key Distribution Procedure into the Digital Signature Standard; Electronics Letters, May 27, 1993; vol. 29, No. 11.

Schnorr, C.P.; "Efficient Signature Generation By Smart Cards"; Journal of Cryptology, 4: 1991; pp. 161 to 174, Springer-Verlag, New York.

Menezes, A. et al.: IEEE P1363 Standard, Elliptic Curve Systems (Draft 2), Part 6: Standard for RSA, Diffie-Hellman and Related Public-Key Cryptography: dated Oct. 30, 1994, published as early as Nov. 1, 1994.

Agnew, G.B. et al.; "An Implementation of Elliptic Curve Cryptosystems Over $F_2 155$"; IEEE Journal on Selected Areas in Communications: Jun. 1993: pp. 804 to 813; vol. 11, No. 5: IEEE: New York: U.S.A.

Bender, A. et al.; "On the Implementation of Elliptic Curve Cryptosystems"; Proceedings on Advances In Cryptology: Jul. 1989; pp. 186 to 192.

Gunther C. G. et al.; "An Identity-Based Key-Exchange Protocol": Advances In Cryptology—Eurocrypt '89: 1990, LNCS 434: pp. 29 to 37: Springer-Verlag, Germany.

Pohlig, S.C. et al.; "An Improved Algorithm for Computing Logarithms over GP(p) and Its Cryptographic Significance"; IEEE Transactions on Information Theory; Jan. 1, 1978; pp. 106 to 110; vol. IT-24, No. 1; IEEE; ISSN: 0018-9448.

Horbach, Christian; Search Report from European Application No. 10186311.5; search completed Dec. 13, 2010.

* cited by examiner

KEY VALIDATION SCHEME

CROSS REFERENCE TO RELATED APPLICATIONS

This application is a continuation of U.S. patent application Ser. No. 10/181,356 filed on Jul. 17, 2002, now U.S. Pat. No. 7,215,773, which is a national entry of PCT Application No. PCT/CA98/00959 filed on Oct. 14, 1998 which claims priority from U.S. application Ser. No. 08/949,781 filed on Oct. 14, 1997, wherein the contents of each are hereby incorporated by reference.

TECHNICAL FIELD

The present invention relates to secure communication systems and in particular to schemes for validating parameters and keys in such systems.

BACKGROUND OF THE INVENTION

Secure data communications systems are used to transfer information between a pair of correspondents. At least part of the information that is exchanged is enciphered by a predetermined mathematical operation by the sender. The recipient may then perform a complimentary mathematical operation to decipher the information. For public key or symmetric key systems, there are certain parameters that must be known beforehand between the correspondents. For example, various schemes and protocols have been devised to validate the senders public key, the identity of the sender and the like. The security or validity of these systems is dependent on whether the signature is a valid signature and this is only the case if system parameters if any are valid, the public key is valid and the signature verifies. Furthermore, an asymmetric system is secure only if system parameters if any are valid, the enciphering public key is valid, the symmetric key is formatted as specified and the symmetric key recovery checks for format validity.

On the other hand a key agreement protocol is secure only if the system parameters, if any, are valid, the key agreement public keys are valid, and the shared secret and symmetric key is derived as specified in a standard. In all of these it is assumed that the public key or symmetric key, i.e., the shared secret, is derived and valid as specified in the protocol scheme. Problems, however, will arise if these parameters are either bogus or defective in some way.

The following scenarios may illustrate the implications of a defect in one or more parameters of a public key cryptographic system. For example digital signatures are used to indicate the authenticity of a sender. Thus if a Recipient A receives a certified public key from a Sender B, then A verifies the certificate, next B sends A a signed message for which A is able to verify the signature and thus assume that further communication is acceptable. In this scenario, however, if B has deliberately corrupted the public key then the Recipient A has no way of distinguishing this invalid public key. Similarly, a Participant C generates a key pair and then subsequently receives a public key certificate, the Participant C then sends the certificate and a subsequent signed message to B under the assumption that the public key contained in the certificate is valid. The participant B can then determine key information for C. Both the above scenarios describe possible problems arising from utilizing unauthenticated parameters in signature verification.

In key transport protocols a Correspondent A may inadvertently send its symmetric key to the wrong party. For example, if Correspondent A receives a certified public key from a Sender B, the certificate is verified by A who then sends a public key enciphered symmetric key and a symmetric key enciphered message to B, thus A is compromised. Conversely, if one of the correspondents C generates a key pair and gets a public key certificate which is subsequently sent to A who public key enciphers a symmetric key and message and sends it back to C, thus, in this case, C is compromised.

In key agreement protocols, one of the correspondents, A for example, receives a certified public key from B and sends B A's certified public key. Each of A and B verify the other's certificate and agree upon a symmetric key. In this scenario A is compromised twice.

It may be seen from the above scenarios that although public key systems are secure the security of the system relies to a large extent on one or both of the correspondents relying on the fact that a claimed given key is in fact the given key for the particular algorithm being used. Typically the recipients receive a string of bits and then make the assumption that this string of bits really represents a key as claimed. This is particularly a problem for a symmetric key system where typically any bit string of the right size may be interpreted as a key. If a bit in the key is flipped, it may still be interpreted as a key, and may still produce a valid crypto operation except that it is the wrong key.

In an asymmetric private key system the owner of the private key knows everything about the private key and hence can validate the private key for correctness. However, should a third party send the owner system a public key, a question arises as to whether the received key conforms to the arithmetic requirements for a public key or the operations using the claimed public key is a secure crypto operation. Unless the owner system performs a check it is unlikely to know for certain and then only by the owner.

From the above it may be seen that key establishment may be insecure. In a paper written by Lim and Lee presented at Crypto '97, this problem was demonstrated in context of the Diffie-Heliman scheme using a bogus public key that did not have the correct order and thus one party was able to find information about the other party's private key. In the RSA or Rabin scheme, which gets its security from the difficulty of factoring large numbers, the public and private keys are functions of a pair of large prime numbers. The keys are generated from the product of two random large prime numbers. Suppose, however, that n is a prime instead of the products of two primes then $phi(n)=n-1$ so anyone can determine d from the bogus "public key" (n,e). These are just examples of the problems a user of a public key can get into if they cannot validate the arithmetic properties of a claimed public key for conformance with the requirements of the algorithm.

SUMMARY OF THE INVENTION

This invention seeks to provide an improved validation in a secure communication system. Furthermore the invention seeks to allow such a validation to be performed by anyone at anytime using only public information.

In accordance with this invention there is provided a method of validating digital signatures in a public key communication system, said method comprising the steps of:

verifying the arithmetic property the public key conforms to the system algorithm; and verifying said digital signature.

A further step provides for the verification of the system parameters.

A still further step provides for including within a certificate information indicative of the claimed public key having been validated for arithmetic conformance with the algorithm and, where appropriate, the amount of validation performed.

BRIEF DESCRIPTION OF THE DRAWINGS

Embodiments of the present invention will now be described by way of example only with reference the accompanying drawings in which.

DETAILED DESCRIPTION OF A PREFERRED EMBODIMENT

Figure 1:
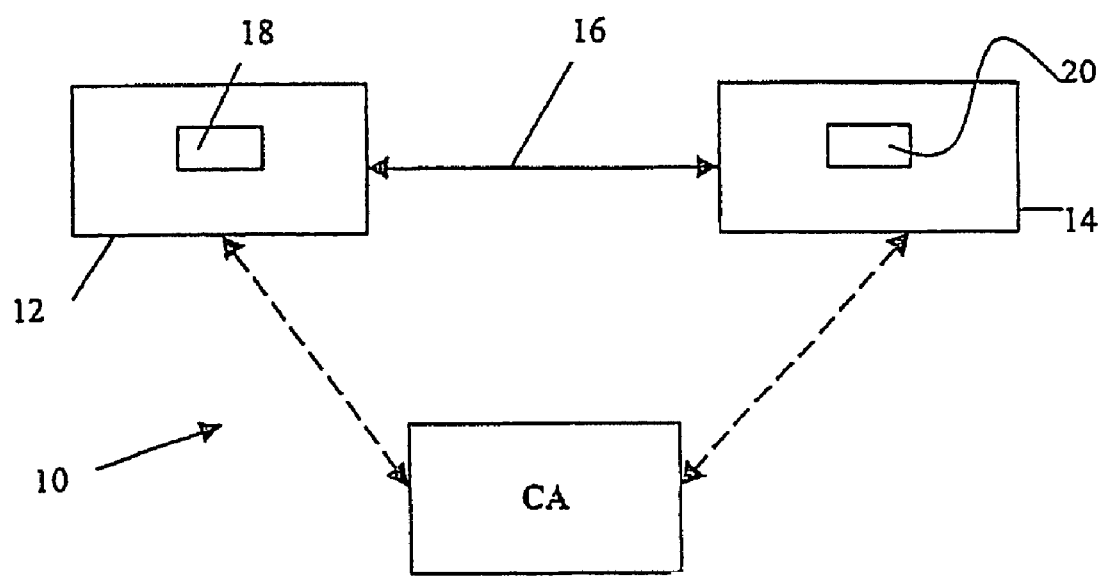
FIG. 1 is a schematic representation of a communication system.

Referring to FIG. 1 a data communication system 10 includes a pair of correspondents designated as a sender 12 and a recipient 14 who are connected by communication channel 16. Each of the correspondents 12, 14 includes an encryption unit 18, 20 respectively that may process digital information and prepare it for transmission through the channel 16. In addition the system 10 may include a certification authority 22.

Embodiments of the invention shall be described with reference to the following aspects of public key algorithms. Key agreement has six routines which are defined as system parameter generation, system parameter validation, key pair generation, public key validation, shared secret derivation and symmetric key derivation. In the key validation step, anyone at anytime can validate a public key using only public information. These routines validate the range and order of the public key. If a public key validates, it means that an associated private key can logically exist, although it does not prove it actually does exist.

For an elliptic curve Digital Signature Algorithm (ECDSA) there are also six routines, defined as system parameter generation, system parameter validation, key pair generation, public key validation, signature generation and signature verification. On the other hand a first type of DSA has four routines, namely system parameter generation, key pair generation, signature generation and signature verification. In a more recent DSA has five routines, namely, system parameter generation, (implicit) system parameter validation, key pair generation, signature generation and signature verification. In order to provide key validation the DSA parameters p, q and g are assumed to have already been validated. The public key=$g^x$ mod p, where x is the private key. The range of y is validated to ensure 1<y<p and the order of y is validated to ensure $y^q$ mod p=1. These tests ensure that a claimed DSA public key meets the arithmetic requirements of such a key. They can be performed by anyone at anytime using only public information.

In RSA or Rabin signatures there are generally three routines, namely key pair generation, signature generation and signature verification. Validating an RSA public key (n, e) involves three steps. Firstly validate e, secondly validate n and thirdly validate e and n are consistent with each other. In order to validate the public exponent e, use of made of the fact that the exponent $2<=e<=2^{(k-160)}$ where k is the length of the modulus n. The requirement that this range be as it is specified is specifically to allow this check. If e>2 then e should be odd. Furthermore, if for a closed network, it is known that the public exponent e must all meet other criteria, e.g., it must be =3 or 65537 or be a random number larger than 65537, these checks can also be done to further confirm the validity of the key. These checks may be incorporated as part of the specification of an RSA public key partial validation routine. Even though the above test for e appears trivial, this test ensures that e was selected before d as intended by the RSA/Rabin algorithm since, it may be shown that de=1 mod (lcm (p−1,q−1) and there are at least 160 high order zeroes in e when compared with modulus n, and this is infeasible to achieve by selecting d first.

In order to validate the modulus n, the sizes of n may be determined. It is known that n is supposed to contain exactly (1,024 plus 128s) bits, where s=0, 1, 2, 3 . . . etc. This can be easily validated and can be part of a partial key validation. Determining whether the modulus n is odd given that n is supposed to be the product of two primes and that all primes after 2 are odd may perform a further validation of the modulus n. Therefore the product of odd numbers is odd so n should be odd. Furthermore, for Rabin when e=2 we know p should be equal to 3 mod n and q should be 7 mod 8. This means n=pq should be =21 mod 8=5 mod 8. This can be validated by ensuring that if e=2, then n=5 mod 8. Furthermore, we know n should not be a perfect power thus this ensures there be two distinctive prime factors and this can be validated by a simple check as documented in the Handbook of Applied Cryptography by Menezes, van Oorschot, and Vanstone.

It is also known that n should be a composite number thus if n is prime the transformation is easily invertible and hence is completely insecure. The fact that n should be composite can be validated by running the Miller-Rabin probable prime test expecting it to actually prove that n is composite. An additional test for validating the modulus n is based on knowing that n is supposed to be the product of two large primes and is supposed to be hard to factor. Therefore attempt to factor it in some simple way, expecting it to fail. For example calculate GCD (n, i) where i runs through all the small odd primes up to a certain limit, say the first 50K odd primes.

From the previous two tests above, it may be seen from the former that at least one factor must be of a size of half the bits of the modulus or less. From the latter it may be seen that each factor must be larger than the largest prime tested. Furthermore there are now only a limited number of potential factors (p, q, r, . . . ) depending on the size of the largest prime test.

The multiple tests above in combination have a synergistic effect. The goal of which is to greatly reduce the freedom of action of an adversary. Even if an attack is not totally impossible, partial key validation can make an attack much more difficult, hopefully infeasible or at least uneconomical.

Furthermore in validating the modulus n, p and q are not supposed to be too close in value therefore assume they are and try to factor n. Use the square root of n as a starting guess for p and q. Then let p decrease while q increases and determine if n can be factored up to a predetermined limit. Furthermore we know for a set of RSA moduli, no prime should repeat therefore given a set of RSA moduli n1, n2 the GCD (ni, nj) can be calculated to ensure the results all equal one.

Offline tests as described above have their limitations. These tests may be extended since the owner of the parameters knows particular information, for example the factorization of n. Thus the owner may be used as an online oracle. By determining if the answers to these questions asked of the oracle are incorrect anyone may declare public key invalid.

It is shown in the Handbook of Applied Cryptography Vanstone et. al. That the owner can take square roots mod n, but others cannot. The validater can determine if a random number mod n has a Jacobi symbol 1 or −1, then half are 1 and the other half are −1. If 1, then number is either a square or not a square, again half each. Validater can square a number mod n. A square always has Jacobi symbol=1.

The validater selects either a known square u or a random element r with Jacobi symbol=1. Asks owner "If this is a square?" for these two types of elements. The owner responds either Yes or No. If u was selected, the owner must say Yes, else key modulus is invalid. If r was selected the owner should say Yes about ½ the time and No about ½ the time, else key modulus is invalid.

This is repeated a number of times to be confident. If the Validater gave the owner all squares, owner should always respond Yes. If the Validater gave the owner all random elements with Jacobi Symbol=1, owner should respond ½ of the time Yes and ½ of the time No. Owner of bogus key only knows that at least half the answers should be Yes. However, owner of the private key knows the factorization of n, they know the squares and thus just need to lie about the pseudosquares, saying some are squares, in order to fool the validater. What is needed is a way for the validater to ask the "Is this a square?" question using a known pseudosquare. Normally, determining if a number is a pseudosquare for a given modulus without knowing the factorization of the modulus is an infeasible problem, however, the owner must respond to the above noted questions with an answer that says that some of the Jacobi=1 numbers are pseudosquares. The validater can form arbitrary known pseudosquares by multiplying a known pseudosquare by a square modulo the modulus. The result will be a value that the validater knows is a pseudosquare. This third type of value t (known pseudosquare) can be asked of the owner and now likes by the owner saying that some pseudosquares are squares can be detected by the validater.

In order to validate e and n together GCD (e, p−1)=1 and GCD (e, q−1)=1. If e is odd, we know p should not be of form xe+1 for some integer x and q should not be of form ye+1 for some integer y. If both p and q are bad then n should not be of form $xye^2+xe+ye+1$ and n≠mod e.

A further method of validating e and n together. It is known that the GCD(e,phi(n)) should be 1. If it is known that phi (n)=(p−1)(q−1), then this is two equations in two unknowns and therefore the validater can factor n.

Assuming the other requirements on a key pair are met, the reason GCD (e,phi(n))=1 is needed is to ensure the operation using e is a one-to-one (invertible) function. Else, the operation using e is many-to-one. If the operation using is many-to-one then d (the inverse of e) does not exist, at least as normally conceived. The owner should give evidence that d actually exists, but the question should not be under the private key owner's control, that is, a self-signed certificate request may not be enough evidence.

The challenge can send the claimed owner some dummy messages to sign. The owner of the private key can verify that they are dummy messages, sign them, and return them to the challenger. This is an online probabilistic oracle test that d exists.

Thus anyone can do offline validation at any time. Anyone can do online validation if owner is online. Owner can do offline and online validation to assure him/herself public key is valid. CA can do online validation and tell others exactly what and how much it validated in the public key certificate.

In the ECDSA the system parameters are field size q=p or $2^m$. An optional seed that generates (a,b) with (a,b) defining an elliptic curve other $F_q$, P a distinguished point on the curve, n, the large prime order of P, h, the cofactor such that the order of curve is hn. The field size, EC defined by (a, b) and point P are primary parameters.

It is important to verify not only the EC system parameters but also the EC public key. For example, given an elliptic curve public key Q, check that Q is on E. In key agreement, and utilizing a prime order curve, then we do not need to check the order of Q since Q certainly has the correct order if it is on the curve. Checking that Q is on the curve is important since an erroneous key may give away the private key a in computing aQ, if Q is not on the curve. Verifying the public key is on the curve may be achieved by substitution into the curve or testing.

Thus it may be seen that key validation may reduce exposure to attacks and help detect inadvertent errors and is also is a valuable service for a CA to perform. Those of ordinary skill in the art will appreciate that the above techniques and methods may be implemented on a suitable processor to carry out the steps of the invention. In addition although the various methods described are conveniently implemented in a general purpose computer selectively activated or reconfigured by software, one of ordinary skill in the art would also recognize that such methods may be carried out in hardware, in firmware or in more specialized apparatus constructed to perform the required method steps.

I claim:

1. A computer-based method for validating digital information transmitted in a data communication system between a pair of correspondents, said method being performed by a correspondent in said data communication system, the correspondent having a cryptographic module; said method comprising the steps of:
   a) said correspondent obtaining an elliptic curve public key generated from a corresponding private key in accordance with an elliptic curve cryptographic scheme, said scheme conforming to a predetermined arithmetic algorithm and said scheme conforming to defined system parameters including an elliptic curve defined over a finite field;
   b) upon obtaining said public key, said cryptographic module employing a processor to verify that said public key is a point lying on said curve;
   c) if said processor verifies said public key is a point lying on said curve, said cryptographic module producing an output indicating said verification; and
   d) said correspondent accepting messages utilising said public key upon obtaining said output indicating said verification.

2. A method according to claim 1 wherein verification that said point is on said curve is performed by said cryptographic module substituting said point in said curve.

3. A method according to claim 1 wherein said correspondent is a certifying authority.

4. A method according to claim 3 further comprising the step of incorporating within a certificate an indication that said public key has been verified.

5. A method according to claim 2 wherein said curve is of prime order.

6. A method according to claim 5 wherein said accepting messages utilising said public key occurs during a key agreement protocol.

7. A method according to claim 6 wherein said cryptographic scheme conforms to the Elliptic Curve Digital Signature Algorithm (ECDSA).

8. A method according to claim 7 further comprising the step of verifying said system parameters.

9. A method according to claim 8 wherein said public key is utilised in combination with a symmetric key and said method further comprises the step of verifying said symmetric key is of a predetermined format.

10. A method according to claim 9 further comprising the step of enciphering said symmetric key with said public key.

11. A computer-based correspondent device in a data communication system, the correspondent having a cryptographic module including a hardware processor, said hardware processor being configured to validate digital information transmitted in the data communication system by performing steps comprising:
   a) obtaining an elliptic curve public key generated from a corresponding private key in accordance with an elliptic curve cryptographic scheme, said scheme conforming to a predetermined arithmetic algorithm and said scheme conforming to defined system parameters including an elliptic curve defined over a finite field;
   b) upon obtaining said public key, using the cryptographic module employing said hardware processor to verify said public key is a point lying on said curve;
   c) if said hardware processor verifies public key is a point lying on said curve, the cryptographic module producing an output indicating said verification; and
   d) accepting messages utilising said public key upon obtaining said output indicating said verification.

12. A correspondent according to claim 11 wherein verification that said point is on said curve is performed by said cryptographic module substituting said point in said curve.

13. A correspondent according to claim 11 wherein said correspondent is a certifying authority.

14. A correspondent according to claim 13 wherein said correspondent is further configured to incorporate within a certificate an indication that said public key has been verified.

15. A correspondent according to claim 12 wherein said curve is of prime order.

16. A correspondent according to claim 15 wherein accepting messages utilising said public key occurs during a key agreement protocol.

17. A correspondent according to claim 16 wherein said cryptographic scheme conforms to the Elliptic Curve Digital Signature Algorithm (ECDSA).

18. A correspondent according to claim 17 wherein the correspondent is further configured to perform the step of verifying said system parameters.

19. A correspondent according to claim 18 wherein said correspondent is configured to utilize the public key in combination with a symmetric key, and wherein said correspondent is further configured to perform the step of verifying said symmetric key is of a predetermined format.

20. A correspondent according to claim 19 wherein said correspondent is further configured to perform the step of enciphering said symmetric key with said public key.

21. A non-transitory computer readable medium having stored thereon computer readable instructions for performing a method for validating digital information transmitted in a data communication system, said method being performed by a computer-based correspondent in said data communication system, the correspondent having a cryptographic module; said computer readable instructions comprising instructions for:
   a) obtaining an elliptic curve public key generated from a corresponding private key in accordance with an elliptic curve cryptographic scheme, said scheme conforming to a predetermined arithmetic algorithm and said scheme conforming to defined system parameters including an elliptic curve defined over a finite field;
   b) upon obtaining said public key, said cryptographic module verifying said public key is a point lying on said curve;
   c) if said public key is a point lying on said curve, said cryptographic module producing an output indicating said verification; and
   d) accepting messages utilising said public key upon obtaining said output indicating said verification.

22. A non-transitory computer readable medium according to claim 21 wherein verification that said point is on said curve is performed by said cryptographic module substituting said point in said curve.

23. A non-transitory computer readable medium according to claim 21 wherein said correspondent is a certifying authority.

24. A non-transitory computer readable medium according to claim 23 wherein said instructions further comprise instructions for performing the step of incorporating within a certificate an indication that said public key has been verified.

25. A non-transitory computer readable medium according to claim 22 wherein said curve is of prime order.

26. A non-transitory computer readable medium according to claim 25 wherein said accepting messages utilising said public key occurs during a key agreement protocol.

27. A non-transitory computer readable medium according to claim 26 wherein said cryptographic scheme conforms to the Elliptic Curve Digital Signature Algorithm (ECDSA).

28. A non-transitory computer readable medium according to claim 27 wherein said instructions further comprise instructions for performing the step of verifying said system parameters.

29. A non-transitory computer readable medium according to claim 28 wherein said public key is utilised in combination with a symmetric key and wherein said instructions further comprise instructions for performing the step of verifying said symmetric key is of a predetermined format.

30. A non-transitory computer readable medium according to claim 29 wherein said instructions further comprise instructions for performing the step of enciphering said symmetric key with said public key.

31. A non-transitory computer readable medium according to claim 21 wherein the non-transitory computer readable medium comprises either hardware or firmware.

* * * * *

UNITED STATES PATENT AND TRADEMARK OFFICE
CERTIFICATE OF CORRECTION

| | | |
|---|---|---|
| PATENT NO. | : 8,116,451 B2 | |
| APPLICATION NO. | : 11/705020 | |
| DATED | : February 14, 2012 | |
| INVENTOR(S) | : Donald B. Johnson | |

It is certified that error appears in the above-identified patent and that said Letters Patent is hereby corrected as shown below:

On the Title Page, item (73), "Assignee: CERTICOM CORPORATION, MISSISSAUGA (CA)" should read as --Assignee: CERTICOM CORP., MISSISSAUGA (CA)--

Signed and Sealed this
Ninth Day of April, 2013

Teresa Stanek Rea
*Acting Director of the United States Patent and Trademark Office*